2,813,061

PRODUCTION OF BACITRACIN

Jack Ziffer, Milwaukee, Wis.

No Drawing. Application November 30, 1954,
Serial No. 472,229

9 Claims. (Cl. 195—96)

This invention relates to the production of the antibiotic bacitracin. More particularly, it relates to a process for producing bacitracin in high yields by microbial fermentation with a bacitracin-producing strain of *Bacillus subtilis*.

The antibiotic bacitracin was first described by B. A. Johnson, H. Anker and F. L. Meleney in "Science," vol. 102, pages 376–377. Prior processes for the production of this antibiotic are illustrated by the disclosures in U. S. Patent No. 2,498,165 to B. A. Johnson and F. L. Meleney and U. S. Patent No. 2,627,494 to W. L. Keko, R. E. Bennett and F. C. Arzberger. As will be seen from these publications, bacitracin was produced in yields ranging from 10 to 92 units per milliliter of fermented medium.

An important object of this invention is to produce bacitracin in high yields.

A particular object is to provide in the fermentation medium substances which result in the production of large amounts of the antibiotic.

A further object is to provide an especially advantageous combination of ingredients in the fermentation medium furnishing high yields of bacitracin.

An additional object is to provide a new and improved process for producing bacitracin by fermentation of a nutrient medium with a bacitracin-producing strain of the microorganism *Bacillus subtilis*. These and other objects of the invention will be apparent on consideration of the specification.

It has now been discovered according to the invention that the production of bacitracin can be markedly improved by carrying out fermentation with a bacitracin-producing strain of *Bacillus subtilis* in the presence of ammonium sulfate and another source of assimilable nitrogen.

A new and improved process for producing bacitracin is also provided in which a nutrient medium containing ammonium sulfate, another source of assimilable nitrogen, and a source of assimilable carbon is fermented with a bacitracin-producing strain of *Bacillus subtilis*.

Proceeding according to the invention, yields of bacitracin have been obtained consistently within the range of 200–300 units per milliliter of fermented medium or fermentation product, which represent considerably increased yields and result in greater availability and decreased cost of the antibiotic.

It had been proposed previously to propagate or cultivate *B. subtilis* in media containing various sources of assimilable nitrogen. Animal and vegetable proteins and amino acids had been employed in the fermentation media. As disclosed in U. S. Patent 2,582,921 to J. Charney, bacitracin had also been produced by fermenting a medium containing ammonium sulfate as the sole source of nitrogen, with *B. subtilis*. However, it was not discovered prior to the present invention that the yields of bacitracin could be increased greatly by carrying out the fermentation in the presence of both ammonium sulfate and a different source of assimilable nitrogen.

The additional nitrogen is preferably supplied by animal or vegtable proteins or amino acids, such as meat extracts, beef infusion broth, tryptone broth, cereal grains, cotton seed meal, flours, meals and grits which are products of seeds of various leguminous plants, such as soybeans, peas, and the like. The preferred additional source of nitrogen is a vegetable protein, especially soybean protein.

Various protein-containing soya products can be employed, preferably defatted soya flour, defatted soya grits and defatted soybean oil meal. Defatted soya products are those containing less than 1% fat by analysis. The defatted protein-containing soybean products are preferably incorporated in an aqueous fermentation medium in an amount equivalent to about 5% to 10% by weight of the medium. Other nitrogen sources may be employed in corresponding amounts, sufficient to provide optimum yields of bacitracin.

Ammonium sulfate is also incorporated in the fermentation medium, preferably at a level of about 0.15% to 0.4% by weight of the medium.

Without intending to be bound by theoretical considerations, it appears that the beneficial effect of the presence of ammonium sulfate in the medium is not due to its nitrogen content but to its apparent effect as a conditioning agent during the enzymatic conversion of the additional nitrogen source to the antibiotic bacitracin. The effect of the ammonium sulfate seems to be due both to the presence of the ammonium ions and to the presence of the sulfate ions. In this connection, other ammonium compounds such as ammonium chloride, ammonium acetate, ammonium citrate and ammonium tartrate, and other sulfates such as sodium sulfate, potassium sulfate and magnesium sulfate do not act in a similar manner.

In the fermentation process, a source of assimilable carbon is incorporated in the medium. Preferably, one of the various carbohydrate materials is included, such as sucrose, glucose, molasses, starch and other materials containing starches and sugars. It is preferred to employ sucrose in a concentration of about 0.7% to 1.7% by weight of the medium. A corresponding amount of another source of carbon furnishing an optimum yield may be provided in the medium.

Calcium carbonate is also included in the preferred medium, and it is provided preferably in an amount equivalent to about 0.1% to 0.5% by weight of the medium. The calcium carbonate acts as a buffer in maintaining the pH in the desired range and it also supplies calcium ions.

In the invention, it is preferred to ferment an aqueous nutrient medium under submerged, aerated conditions, preferably with agitation. Fermentation is continued until the content of bacitracin substantially reaches a maximum, at which time it is discontinued and the bacitracin is recovered from the fermentation product. Substantial amounts of bacitracin are produced in less than one day, but the maximum production is usually reached after about one to two days of fermentation under suitable conditions of temperature and aeration. Bacitracin is recovered from the fermented medium by known methods such as by solvent extraction or by adsorption and elution, as described in the above referred to publications.

The bacitracin concentration in the medium is ascertained by the recognized cup-plate assay method, the assay standard being standardized against the Food and Drug Administration official master standard. The assay values reported herein were obtained by this method.

The fermentation medium is prepared by mixing the above ingredients in the indicated proportions with water, and sterilizing by heating the mixture at an elevated temperature, perferably for about 15 minutes to 2 hours at about 121° C. The medium is then cooled to a temperature of about 25-40° C. and inoculated with a culture of a bacitracin-producing strain of B. subtilis. The medium is then aerated and agitated at about 25-40° C., preferably about 28-35° C., for the time necessary to achieve optimal, ordinarily maximal production of bacitracin, as determined by periodic assays. The pH is preferably maintained in the range 6.5-7.5, although some variation is permissible. The pH is maintained in the preferred range by the usual fermentation methods.

The following examples are furnished to assist in providing a complete understanding of the invention, but it is to be understood that the invention is not limited thereto nor to the specific ingredients, proportions and procedures set forth therein, which are given only for purposes of illustration.

EXAMPLE 1

| | Percent |
|---|---|
| Defatted soya grits | 5 |
| Sucrose | 1.2 |
| (NH₄)₂SO₄ | As indicated |
| CaCO₃ | 0.2 |
| Water | Balance |

The medium prepared by this formula was dispensed in 40 ml. quantities in 250 ml. Erlenmeyer flasks and sterilized for 45 minutes at 121° C. After cooling, the flasks were inoculated with 0.5% by volume of a 20-24 hour culture of a bacitracin-producing strain of the bacteria of the B. subtilis group. The flasks were incubated at 28° C. on a rotary shaker (225 strokes per min.) for 45 hours. Bacitracin yields obtained are given in Table I:

Table I

| | Units/ml. |
|---|---|
| No (NH₄)₂SO₄ | 169 |
| 0.2% (NH₄)₂SO₄ | 230 |

The results show that the inclusion of ammonium sulfate in the medium together with another source of nitrogen provides a high yield of bacitracin constituting a large increase in yield over that obtained in the absence of ammonium sulfate.

EXAMPLE 2

| | Percent |
|---|---|
| Defatted soya flour | As indicated |
| Sucrose | 1.2 |
| (NH₄)₂SO₄ | 0.2 |
| CaCO₃ | 0.2 |
| Water | Balance |

The procedure of Example 1 was repeated, and the bacitracin yields obtained are given in Table II:

Table II

| | Units/ml. |
|---|---|
| No soya flour | Less than 10 |
| 7% soya flour | 284 |

The results show that the yield provided by ammonium sulfate alone is very small and that the results obtained in Example 1 with the additional inclusion of ammonium sulfate represent much more than the sum of its individual effect and that of the other nitrogen source. The results further demonstrate that much greater yields are obtained when the combination of materials is employed.

EXAMPLE 3

| | Percent |
|---|---|
| Defatted soya grits | 5 |
| Sucrose | 1.2 |
| (NH₄)₂SO₄ | 0.2 |
| CaCO₃ | 0.2 |
| Water | Balance |

Twelve liter glass fermentors were charged with 8 liters of the above medium and sterilized for 2 hours at 121° C. After cooling to 32°-33° C., they were inoculated with 0.5% by volume of a 20-24 hour culture of a bacitracin-producing strain of B. subtilis. The fermentors were agitated at 320 R. P. M. and aerated at the rate of 6 liters per minute. The pH of the medium was maintained in the range of 6.5-7.5, and fermentation was conducted at about 32-33° C. Bacitracin yields obtained are given in Table III:

Table III

| Hours: | Units/ml. |
|---|---|
| 17 | 68 |
| 20 | 147 |
| 24 | 208 |
| 28 | 246 |

Proceeding according to the invention, yields of bacitracin produced by fermentation with B. subtilis are increased greatly. The materials employed in the fermentation medium are readily available and economical, and the process is simple yet effective. The process represents a considerable improvement in the production of bacitracin, so that its availability is increased and its cost reduced.

The invention is hereby claimed as follows:

1. In a process for producing bacitracin by fermentation with a bacitracin-producing strain of Bacillus subtilis, the improvement which comprises carrying out the fermentation in the presence of ammonium sulfate and a protein.

2. In a process for producing bacitracin by fermentation with a bacitracin-producing strain of Bacillus subtilis, the improvement which comprises carrying out the fermentation in the presence of ammonium sulfate and a vegetable protein.

3. In a process for producing bacitracin by fermentation with a bacitracin-producing strain of Bacillus subtilis, the improvement which comprises carrying out the fermentation in the presence of ammonium sulfate and soybean protein.

4. In a process for producing bacitracin by fermentation with a bacitracin-producing strain of Bacillus subtilis, the improvement which comprises carrying out the fermentation in the presence of about 0.15% to 0.4% by weight of the fermentation medium of ammonium sulfate, and a protein.

5. The process for producing bacitracin which comprises fermenting a nutrient medium containing ammonium sulfate, a protein, a carbohydrate, and calcium carbonate with a bacitracin-producing strain of Bacilus subtilis.

6. The process for producing bacitracin which comprises fermenting a nutrient medium containing ammonium sulfate, soybean protein, sucrose, and calcium carbonate with a bacitracin-producing strain of Bacillus subtilis.

7. The process for producing bacitracin which comprises fermenting an aqueous nutrient medium containing about 0.15% to 0.4% by weight of the medium of ammonium sulfate, a protein and a carbohydrate with a bacitracin-producing strain of Bacillus subtilis.

8. The process for producing bacitracin which comprises fermenting an aqueous nutrient medium containing in percentages by weight of the medium about 0.15% to 0.4% of ammonium sulfate, about .5% to 10% of a defatted protein-containing soybean product, about 0.7% to 1.7% of sucrose, and about 0.1% to 0.5% of calcium carbonate with a bacitracin-producing strain of Bacillus subtilis.

9. The process for producing bacitracin which comprises fermenting a nutrient medium containing ammonium sulfate, a protein-containing soya product from the group consisting of soya flour, soya grits and soybean oil meal, a carbohydrate, and calcium carbonate with a bacitracin-producing strain of Bacillus subtilis.

References Cited in the file of this patent

UNITED STATES PATENTS

| | | |
|---|---|---|
| 2,498,165 | Johnson et al. | Feb. 21, 1950 |
| 2,582,921 | Charney | Jan. 15, 1952 |
| 2,627,494 | Keko et al. | Feb. 3, 1953 |

OTHER REFERENCES

Hendlin: Arch. Biochem. 24 (1949), pp. 435–446.
Inskeep et al.: I. and E. Chem., 43, 7, pp. 1488–1498.
Chemical Abstracts 49: 7182(g), Bacitracin by Fermentation.
Chemical Engineering, June 1953, pp. 282–285.